March 19, 1940.  R. SANSOM  2,194,211
VARIABLE SPEED MOTOR
Filed Aug. 1, 1938   2 Sheets-Sheet 1
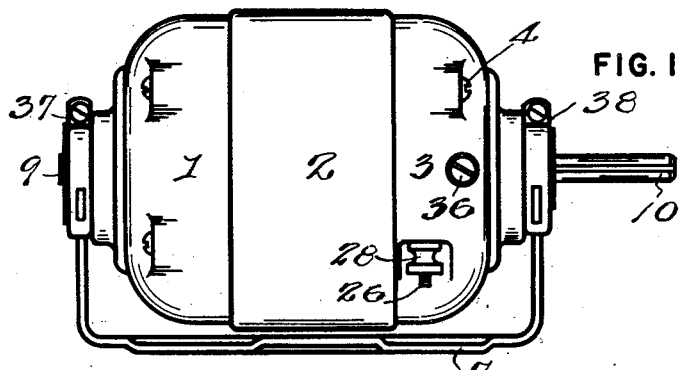
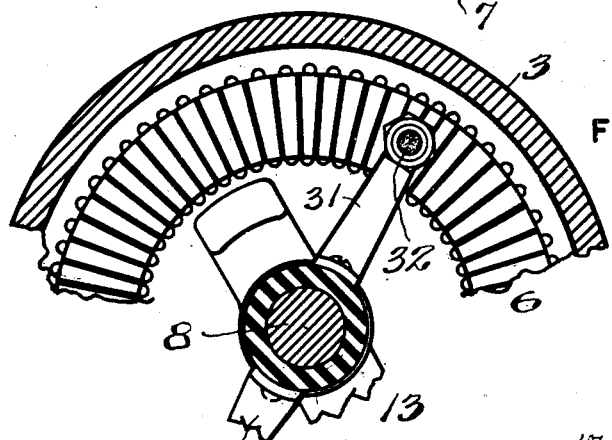
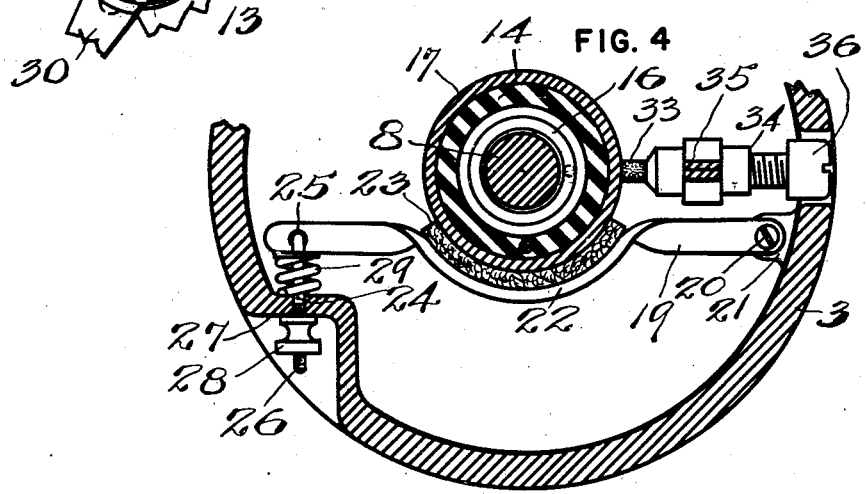
RAY SANSOM
Inventor
By Herbert E. Smith
Attorney March 19, 1940.   R. SANSOM   2,194,211
VARIABLE SPEED MOTOR
Filed Aug. 1, 1938   2 Sheets-Sheet 2

RAY SANSOM
Inventor

Herbert E. Quitti
By
Attorney

Patented Mar. 19, 1940

2,194,211

UNITED STATES PATENT OFFICE 2,194,211

VARIABLE SPEED MOTOR

Ray Sansom, Milton, Oreg., assignor of thirty per cent to Clark O. Harris, Milton, Oreg.

Application August 1, 1938, Serial No. 222,509

6 Claims. (Cl. 171—221)

The present invention relates to improvements in variable speed electric motors in which the rotation of the armature shaft is controlled or regulated, as to its speed of rotation, within a wide range, from the maximum speed of the motor running under usual conditions, to a minimum low speed of the armature or driving shaft of the motor. The variable speed motor of my invention is adapted for driving sewing machines, earth boring drills, and other machines and appliances, which require changes in their operating speed without interrupting the operation of the motor or driving mechanism.

In carrying out my invention I employ a novel arrangement of the commutator unit of the motor, the armature shaft or motor shaft, and a frictional brake device, for reducing or decreasing the rotary movement of the motor shaft. The action of the brake device is applied to the brushes through the use of a resilient or electric drive-coupling between the rotating part of the commutator and the rotary shaft, and the braking action is produced by creating a variable resistance on the part of the driven member or commutator to the driving member of the coupling or the armature shaft.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention, but it will be understood that various changes and alterations may be made in these exemplifying structures, within the scope of my claims without departing from the principles of the invention.

Figure 1 is a view in side elevation of an electric motor embodying my invention.

Figure 3 is a partial transverse sectional view of the motor as at line 3—3 of Figure 2; and Figure 4 is a partial transverse sectional view at line 4—4 of Figure 2.

Figure 2:
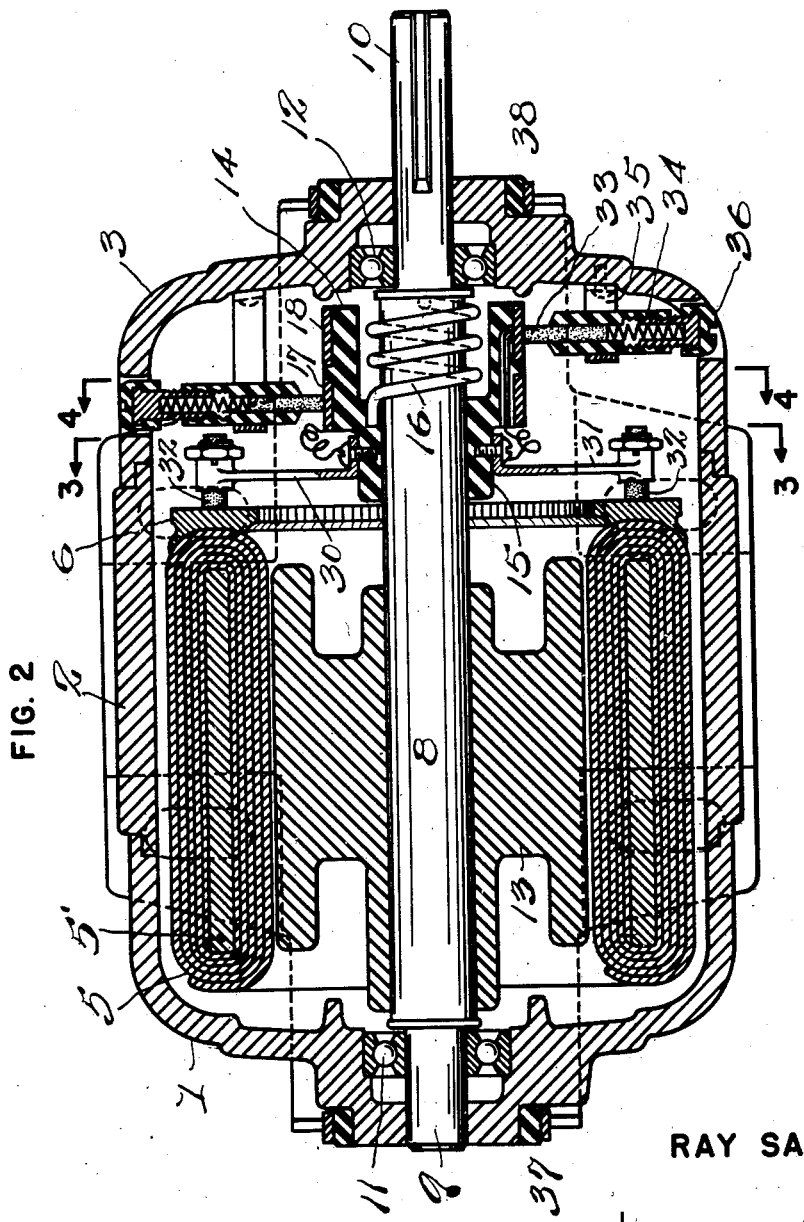
Figure 2 is a longitudinal sectional view of the motor.

In the general assembly views of Figures 1 and 2 the motor housing is shown as comprising sections 1, 2, and 3, that are suitably joined together by screws as 4, and within the housing is rigidly mounted the electromagnet or magnetic field of continuous coils 5 wound upon the core 5'. In utilizing the magnetic field of the motor for my use I employ a flat segmental commutator ring 6 that is fixed to the magnetic field and located in one end of the housing. The motor is supported in any usual manner, as by a frame 7 shown in Figure 1.

The armature shaft or motor shaft 8, which extends longitudinally of the housing has its reduced ends or journals 9 and 10 supported in bearings 11 and 12 at the opposite ends of the housing, and the journal 10 is adapted to be keyed or united with a driving shaft in usual manner. The armature core or rotor 13 is substantially rectangular in cross-section and is rotated on its axis by the pull from the static coil or field, the sections of which are energized in advance as will be more fully described hereinafter. The rotor presents opposed faces to the coil or field and these faces extend along the length of the coil. The core is rigidly mounted on the armature shaft with the usual air gap between it and the magnetic field.

Within the interior of one end of the housing an open cylindrical drum 14 of insulating material, and having an integral hub 15 is loosely mounted on the shaft, adjacent to the commutator ring 6. The drum is loose on the shaft, but it is connected to the shaft by means of a torsion spring 16, coiled about the shaft, with one end of the spring fixed to the hub 15 and the other end of the spring anchored to the shaft, thereby providing a resilient coupling or elastic driving connection between the shaft and the hub of the drum. Under high speed operation of the shaft, the torsion spring, after causing an initial cushioned start in the nature of a resilient resistance or lag of the drum, then transmits the rotary movement from the shaft to the drum so that the latter rotates, under high speed, at substantially the same speed as the shaft. By increasing the resistance of the rotary drum to the torsion of the driving spring the speed of the shaft may be decreased, and conversely, by reducing the resistance of the rotary drum to the speed of the shaft, the speed of the shaft is increased.

This variable resistance of the rotary drum and consequent variation of the speed of the rotary armature shaft is accomplished in connection with two spaced collector or conducting rings 17 and 18 that are rigidly mounted on the exterior periphery of the drum, in combination with a frictional breaking or retarding device that is here shown as manually adjustable from the exterior of the housing, but which may be manipulated in other suitable manner.

As best seen in Figure 4, a brake lever 19 is pivotally suspended at 20 on an interior bracket 21 integral with the housing-section 3, and the lever extends transversely of the housing below the drum. The lever is fashioned with a central curved seat 22 in which is mounted a replaceable brake shoe or wear pad 23 of suitable material that conforms to the periphery of the cylindrical rings 17 and 18, and as indicated the brake shoe is adapted to frictionally engage both of these collector rings 17 and 18.

An adjusting bolt 24 is pivoted at 25 to the free end of the brake lever, and the threaded end 26 of the bolt projects through a hole in an inset wall 27 of the housing. On this threaded end of the bolt is threaded an adjusting nut 28 readily accessible for manual operation, and coiled about the bolt within the housing is a spring 29 interposed between the free end of the lever and the inset wall 27 of the housing. The degree of expansion of the spring is regulated or controlled by manual turning of the adjusting nut. The spring, under tension, and by its pressure against the free end of the brake lever, tends to apply the brake shoe to the drum, and thereby retard the rotation of the drum, which creates a resistance to the rotation of the armature shaft and thus reduces the speed of rotation of the shaft. By turning the nut to reduce the frictional engagement between the brake shoe and the drum the shaft is permitted to rotate at increased speed, while at maximum high speed of the shaft, the brake shoe is entirely released from contact with the drum.

In the arrangement of the commutator unit for co-action with the commutator ring 6 I mount upon the hub of the drum a pair of radial arms 30 and 31, and at the outer ends of the arms are carried the brushes 32 in frictional contact with the segmental commutator ring, and these brushes, as indicated in Figure 2 are connected to the respective collector rings 17 and 18.

The collector rings are also provided with stationary brushes 33 resiliently mounted in their insulated holders 34, and the latter are supported from the housing by interior brackets 35. These brushes are adjustable to take up wear by the use of screw caps 36 that project through holes in the housing, and are readily accessible from the exterior of the motor.

In operation when the current circuit is closed, the drum is rotated by the pull from the coil sections energized in advance by contact of the brushes 32. The angular lead of the brushes is determined by the frictional pressure of the brake on the drum and, of course, the speed of the armature shaft depends on the degree of the angular lead of the brushes 32 over the rotor. As seen in Figure 3 the brush 32 is well in advance of the upper extremity of the rotor. However, when the pressure is fully applied to the brake shoe against the tension of the spring 16, the lead is decreased to zero and the pull is therefore radial and no movement is imparted to the rotor.

The usual main wires from a source of electric supply are connected in suitable manner to the motor, as at the terminals 37 and 38, and the lead wires of the various parts of the magnetic field, the armature, and the commutator unit, are arranged in customary manner for the operation of the motor, as indicated in Figure 2.

Having thus fully described my invention, what I claim as new and desire to secure by Letters Patent is:

1. In a variable speed electric motor, the combination with a magnetic field structure and its fixed commutator ring, of an armature and its shaft, a rotatable commutator-unit including a member loose on the shaft, a resilient driving connection between said member and the shaft, and means for varying the resistance of said member to the motion of the shaft for varying the speed of the shaft.

2. In a variable speed electric motor, the combination with a magnetic field structure and its fixed commutator ring, of an armature and its shaft, a rotatable commutator-unit including a member loose on the shaft, a resilient driving connection between said member and the shaft, and a brake device for frictional engagement with the member, for varying the speed of the shaft.

3. In a variable speed electric motor, the combination with a magnetic field structure and its fixed commutator ring, of an armature and its shaft, a drum loose on the shaft, brush holders mounted on the drum and brushes frictionally engaging said ring, spaced collector rings on said drum and brushes mounted for engagement with said collector rings, a resilient driving connection between said drum and the shaft, and a brake device for frictional engagement with said collector rings.

4. In a variable speed electric motor, the combination with a magnetic field structure and its fixed commutator ring, of an armature and its shaft, a rotatable commutator-unit for co-action with the ring and including a member loose on the shaft, a resilient driving connection between said member and the shaft, a brake lever pivotally supported within the motor and a brake shoe on the lever engaging said member, and means for releasing said brake shoe and lever.

5. In a variable speed electric motor, the combination with a magnetic field structure and its fixed commutator ring, of an armature and its shaft, a rotatable commutator-unit for co-action with the ring and including a member loose on the shaft, a resilient driving connection between said member and the shaft, a brake lever pivotally supported within the motor and a brake shoe on the lever for engagement with the member, a spring device tending to apply the shoe to the member, and means for releasing the shoe from said member.

6. In a variable speed electric motor, the combination with an armature shaft, a drum loosely mounted thereon, and a torsion spring forming a driving connection between said drum and shaft, of a brake lever and shoe pivotally supported in the motor, a spring device tending to apply the shoe to said member, an adjusting bolt mounted in the motor and pivoted to the free end of the lever, and an adjusting nut threaded on the bolt.

RAY SANSOM.